United States Patent [19]

Terashita

[11] Patent Number: 4,884,102
[45] Date of Patent: Nov. 28, 1989

[54] CONTROLLING METHOD FOR A PHOTOGRAPHIC SYSTEM

[75] Inventor: Takaaki Terashita, Kaisei, Japan

[73] Assignee: Fuji Photo Film Co., Ltd., Kanagawa, Japan

[21] Appl. No.: 355,105

[22] Filed: May 18, 1989

Related U.S. Application Data

[63] Continuation of Ser. No. 865,024, May 20, 1986, abandoned.

[30] Foreign Application Priority Data

May 22, 1985 [JP] Japan ............... 60-109767
May 29, 1985 [JP] Japan ............... 60-116256
Dec. 19, 1985 [JP] Japan ............... 60-284320

[51] Int. Cl.$^4$ ............... G03B 27/32; G03B 27/80
[52] U.S. Cl. ............... 355/77; 355/35; 355/38
[58] Field of Search ............... 355/35, 38, 77

[56] References Cited

U.S. PATENT DOCUMENTS

| | | | |
|---|---|---|---|
| 3,612,683 | 10/1971 | Riley et al. | 355/35 |
| 3,937,573 | 2/1976 | Rising | 355/35 |
| 4,174,173 | 11/1979 | Pone | 355/38 |
| 4,175,856 | 11/1979 | Pone | 355/77 |
| 4,244,653 | 1/1981 | Asai et al. | |
| 4,335,399 | 6/1982 | Matsumoto | |
| 4,344,704 | 8/1982 | Thurm et al. | 355/35 |
| 4,397,545 | 8/1983 | Terashita | 355/77 |
| 4,416,539 | 11/1983 | Terashita | |
| 4,417,818 | 11/1983 | Weisner | 355/35 |
| 4,469,437 | 9/1984 | Yuasa et al. | 355/35 |
| 4,535,413 | 8/1985 | Shiota et al. | |
| 4,577,961 | 3/1986 | Terashita | |
| 4,641,959 | 2/1987 | Terashita | |

*Primary Examiner*—Monroe H. Hayes
*Attorney, Agent, or Firm*—Wenderoth, Lind & Ponack

[57] ABSTRACT

The factors necessary for controlling photographic systems involve the photographic characteristics such as developing process characteristics which are subject to complicated interaction among various factors. Since it is difficult to measure and control such variable factor independently, situations involving such variations are preferably grasped comprehensively by a small number of criteria or values and controlled with a small number of values having high correlation with the variations. When gray image of an original film is photometrically measured at printing in three primary colors, the image densities in the colors are not uniform even with the same exposure and image density ratio is not uniform, either. This invention method enables optimum control of the photographic system by estimating the current photographic characteristics with the data up until the current spot, and further enables normalization of measured data at a high precision.

8 Claims, 9 Drawing Sheets

FIG. 1

PRIOR ART

FIG. 2

PRIOR ART

CONTROLLING METHOD FOR A PHOTOGRAPHIC SYSTEM

This application is a continuation of now abandoned application, Ser. No. 865,024 filed on May 20, 1986 now abandoned.

BACKGROUND OF THE INVENTION

This invention relates to a controling method for a photographic system which is capable of detecting and controlling photographic characteristics which are subject to chronological changes (e.g. development process characteristics, printing condition characteristics, etc.) with a high precision. It further relates to a normalization method for photographically measured data of three primary colors.

The factors which should be taken into consideration for controlling a photographic system involve not only the factors which can be learned by simple measurement (for instance, changes of the light source in a photographic printer) but also complicated factors which are subject to interaction of various conditions (development process characteristics, printing condition characteristics and image reproduction characteristics, etc.). For instance, the data on the development process characteristics contain variation in the performance of photographic photo-sensitive materials (usually the control film) used in detection, the chronological changes thereof and variation in densitometers besides the characteristics of the developing agents per se. Photographic printing conditions similarly involve the variations in characteristics of the printing film, objects, light sources and/or printers besides the above development process characteritics which should be comprehensively considered and judged for optimum control or administration. Such control or administration usually needs manipulation of a device or experience or skill of an operator and even with these contributions of men, it cannot always be performed at a high precision. The control or administration of these sytems are preferably conducted automatically without need for human contribution, and it needs a method and system which are capable of quantitatively measuring the conditions.

Since all of these variables in photographic characteristics are difficult to separately measure and control, the control should be based on a small amount of data with which conditions can be comprehensively grasped or a small amount of data which have high correlation with such variations.

Figure 1:
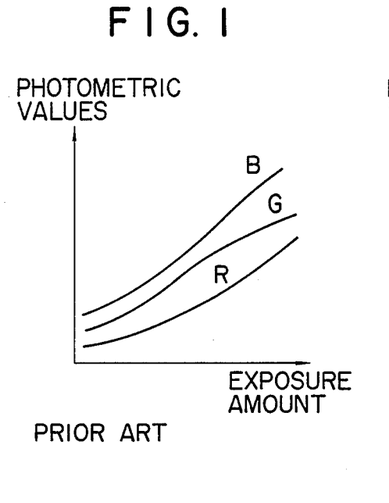
FIGS. 1 and 2 are graphs for explanation of the prior art normalization.
Figure 2:
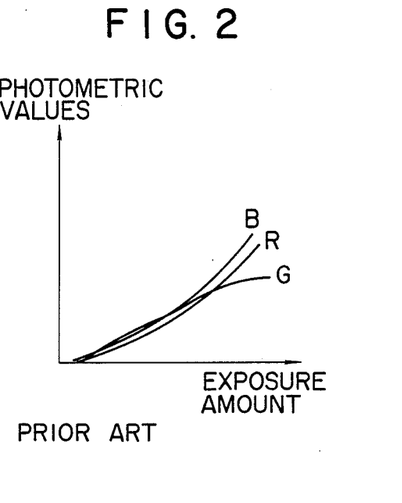

When gray images of an original film are measured photographically as they are printed in three primary colors of RGB by a photographic color printer, the photographic values obtained for RGB are neither identical in image density at the same exposure amount nor in the ratio of image densities of the three colors against a series of exposure amounts as shown in FIG. 1. They are subject to variations depending on the development process and/or the photo-sensitive materials. This is partly because optimally reproduced images can be obtained by a combination of a negative film sheet as an original film which should be printed and a photographic paper which is a printing material, usages are different for each type of photosensitive materials, design concepts differ depending on the manufacturer, and it involves variations in the development process characteristics and the photometric fiber characteristics of the original film. When the photometric values for three primary colors do not have the same characteristics, the film densities and colors may often fluctuate for the same object. More specifically, a blue sky may be reproduced with a density similar to a gray clouded sky, which greatly affects subsequent processing such as the determination of exposure amount or color correction. Since the sensitivity of RGB or gradation balance is varied depending on the photographic paper types or the developing processes, the color or the density of a negative film may often be erroneously judged in detection or control. It is desirable that the same object be photographed on a negative film sheet at a constant density and in color irrespective of the types of the photographic paper or the developing processes. In the prior art, the photometric values in RGB are normalized as shown in FIG. 2. The nomalization method, however, is detrimental in the following aspects.

Japanese Patent Laid Open No. 145620/1978 discloses a hue extraction device comprising a means for correcting the sensitivity by adding a given constant to the density signals of blue, green and red, and a nomalization means having a means for $\gamma$-correction by amplifying density signals. The application does not refer to the method for obtaining the correction amount in sensitivity and the $\gamma$-correction amount, and requires in practice preparation of reference negative film sheets for various types of the photographic materials at suitable interval to be used in obtaining the correction amount. The method therefore is cumbersome as it must decide which a reference film should be used and it needs preparation thereof and determination of the correction amount. The photographic printing conditions can be determined based on the sensitivity of a film and $\gamma$-value aiming at the same effect as the normalization of the film. The prior art photographic printing conditions, however, include the characteristics of a photographic paper and a photographic printer, which makes the $\gamma$-value of a film difficult to be obtained from the slope control values related thereto. The determination of printing conditions and the administration thereof present formidable difficulties in practice. The method, therefore, can not quite achieve the above mentioned effect.

Japanese Patent Laid Open No. 30121/1981 discloses a method which sequentially corrects the deviation of the average of a large number of frames from a reference value in the large area transmittance density (LATD). The method is used to correct the correction coefficients of the photographic values by using the average of normalized densities and not to obtain the correction coefficients thereof. Since the method sequentially corrects the data, it can correct the normalization conditions only very slowly and it may not converge to a value. The prior application does not mention any process for the correction of gradation.

Japanese Patent Publication No. 10730/1975 discloses a decision formula for detecting the subjective color failures which uses a constant proportional to the reciprocals of the average density and gradation of the reference negative film. The method aims at checking the presence/absence of the difference in RGB densities between the reference negative film and a negative film to be printed, which also involves the use of the reference negative film.

There has long been desired by many a method which is capable of automatic controlling of the film characteristics (i.e. densities or gradation balance, etc.) which are subject to variation depending on the developing process for the optimum exposure control.

SUMMARY OF THE INVENTION

This invention was conceived in order to eliminate aforementioned troubles encountered in the prior art and aims at providing a controlling method for photographic systems which can assume the current conditions of the chronologically variable photographic characteristics by processing data up to the time point so as to optimally control and administer the system with suitably up-dated data.

Another object of this invention is to provide a method which can normalize the data in RGB at a high precision in a color photographic printer.

Stil another object of this invention is to provide a method for normalization of data in photographic printing systems which allows automatic adjustment of a photographic printer to variations in developing process, notifies an operator when a predetermined quality can not be sustained any more so that high quality operation can be constantly maintained by replacement of developing agents and can be easily used by unskilled operators.

According to one aspect of this invention, for achieving the objects described above, there is provided a controlling method for a photographic system which is characterized in that photographic characteristics of the system are measured and stored chronologically, the importance of said photographic characteristics are varied as time functions to obtain weighted average characteristics, and said photographic system is controlled based on such weighted average characteristics in an analogical manner.

According to another aspect of this invention, there is provided a normalization method for measured data in a photographic system of the type where printing exposure is determined based on the photographic data obtained from measurement of an original film roll in three primary colors and said original film is printed with thus determined exposure, in which correction coefficients are obtained based upon uncorrected data accumulated for said original film, and said measured data are normalized based on said corrction coefficients.

Furthermore, according to still another aspect of this invention, there is provided a normalization method for measured data in a photographic system of the type where printing exposure amunt is determined based on the photographic data obtained from measurement of an original film roll in three primary colors and said original film is printed with thus determined exposure amount, in which a conversion table is prepared when predetermined conditions are met, by transforming frame characteristics on a large number of original film rolls into predetermined reference values based upon stored data and normalizing said measured data in accordance with the conversion table.

The nature, principle and utility of the invention will become more apparent from the following detailed description when read in conjunction with the accompanying drawings.

DESCRIPTION OF THE PREFERRED EMBODIMENTS

Figure 3:
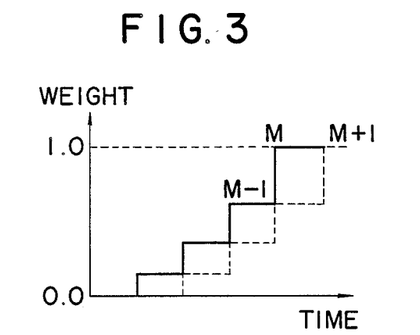
FIGS. 3 through 5 are graphs which respectively describe one example of this invention control method.

This invention attempts to control a photographic system which is subject to chronological changes by sequentially storing the photographic characteristics of the system, using the same as a chronological function to modify the importance of each characteristic to obtain a weighted average photographic characteristic. More particularly, positive weights are added to the photographic characteristics of predetermined time (e.g. one day or ten days) or a predetermined amount (e.g. 1,000 frames) consecutively in a manner that the weight becomes smaller as the data goes retrogressively afar from the current time point, and the control is conducted based on the weighted moving average photographic characteristics. The photographic characteristics of a predetermined time or amount may be determined as an average of individual photographic characteristics within a predetermined scope (e.g. time or amount), and that may be stored to obtain the weighted average photographic characteristics. Weight may be varied for each storage. The photographic characteristics of a predetermined time or amount may be weighted to sequentially renew the average or sum thereof and to change weight for each time as shown in FIG. 3. In the case shown in the figure, the weighted average up to M is multiplied with a weight coefficient W (W < 1.0) and added to the average of (M + 1) to renew the weight.

Figure 4:
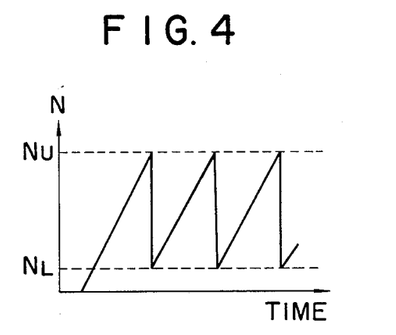

Alternatively, as shown in FIG. 4, a stored number N of the photographic characteristics is set in relation to time within the scope not above the limit $N_u$ and not below the limit $N_l$ and when the data number has reached the upper limit $N_u$, it is transformed to the lower limit $N_L$ to start from the value anew. If the sum and the data number are stored, when the data number has reached the upper limit $N_u$, the process starts anew from the value obtained by multiplying the sum and the data number with n (n<1 and n≠0). Alternatively, an average value may be stored in place of the sum. More particularly, if the average $\overline{A}$, the data number is N and the photographic characteristics at the current time point is $A_o$, the equation below holds in storage;

$$\bar{A} = (\bar{A} \cdot N + A_o)/(N+1)$$

$$= N+1$$

and when the number N has reached the upper limit $N_u$, as $N=N_l$, the process starts again anew.

It is assumed that $N_L = N_u \cdot n$, and n is a positive number smaller than 1 (for instance $\frac{1}{4}$, $\frac{3}{8}$...).

Figure 5:
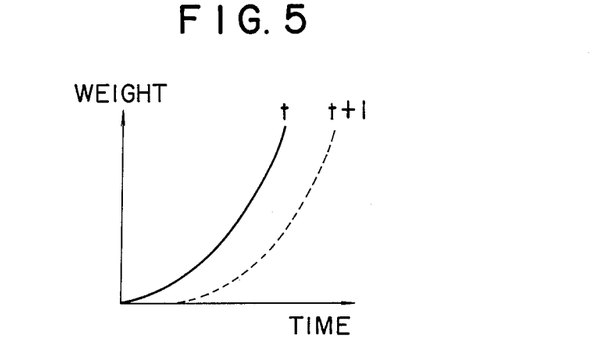

FIG. 5 shows another method to determine the weighting coefficient. In this weighted moving average method, the data in the past is weighted relatively less than the data closer to the current time point to estimate the current situation.

Figure 6:
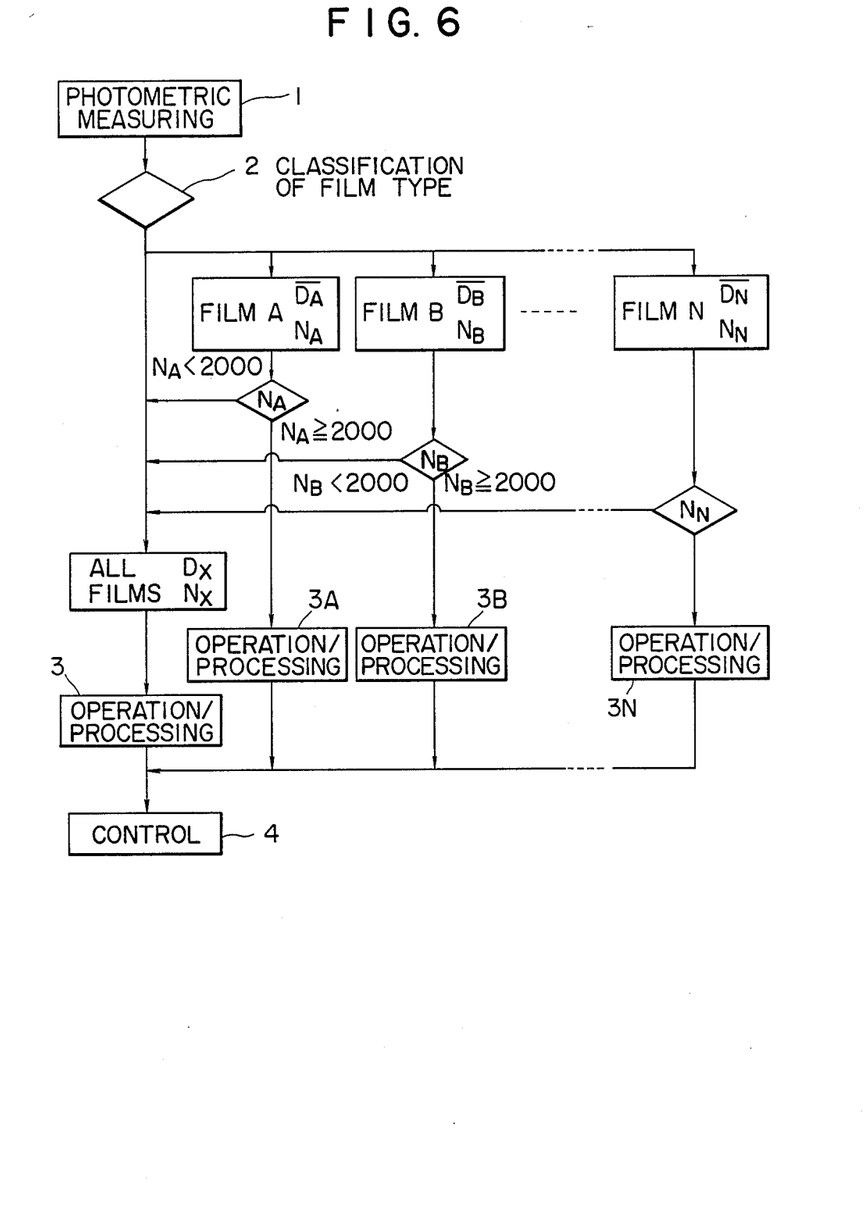
FIG. 6 is a flow chart to obtain average characteristics of a film according to this invention.

FIG. 6 shows an example to obtain the average characteristic of film sheets. A sheet of film is photometrically measured (1) by an image sensor and so on, the type of the film is classified (2) as (A, B, .....N) based on the class information and the photographic characteristics $\bar{D}$ are stored. When the stored number N is smaller than 2,000, it is operated and processed (3) with the average $D_x$ obtained from the stored data on all the film sheets, and when the data number is larger than 2,000, the stored average $D_x$ is not used, but the average characteristics obtained from the stored data on individual film sheets is sued for the control (4) for photographic printing. More specifically, if 100 film rolls are processed per day for one type of film (in other words, ca. 2,000 data/day), and if the range is limited at 4,000 at the ceiling and at 20,000 at the bottom, the weight is modified once in a 10-day cycle. The upper and bottom limits are preferably changed for each type of the film rolls depending on the amount of process. The changes in film development and seasonal variation are sequentially traced to detect the amount thereof and control is conducted based thereon. In the control based on the average of a large number of data, the contribution of a data of the 1,000th frame to the control differs from that of a data of the 100,000th frame. Although the precision as an average of the data of 100,000 frames is higher, it is contradictorily less efficient as the data to estimate the current conditions. In other words, although it takes a long time to store a large amount of data, the farther past the data concerns, the less it reflects the current situation. This invention solved such a contradictory problem by using a weighted moving average.

In FIG. 6 in the control of the printing conditions, for example, the average characteristics is expressed in the average LATD (Large Area Tansmittance Density) and the operational processing is conducted on the difference between the reference LATD and an obtained averag LATD. It represents that the developing characteristics deviate from the reference value by the LATD difference and the printing conditions are corrected or adjusted to eliminate such a deviation. The operational processing needed for normalization of a characteristic curve which is variable depending on the type of film is the calculation of normalization conditions. If the data number is 2,000 or less, it may use the initial value which has been stored in advance and the system may include initial input means therefor.

Figure 7:
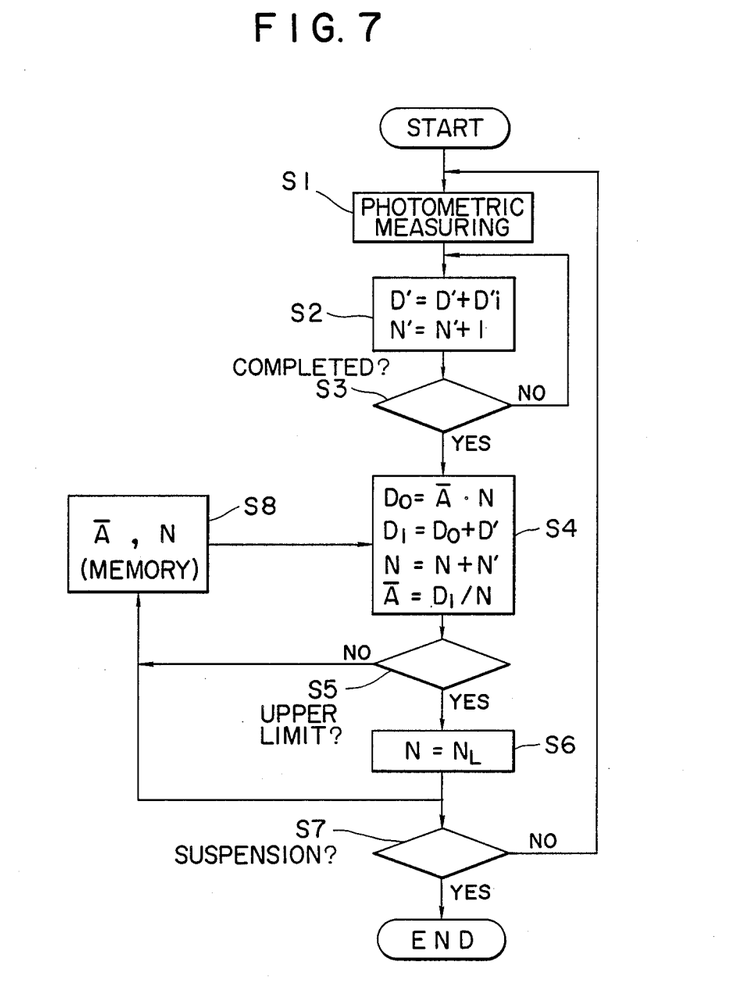
FIG. 7 is a flow chart to show one example of addition and initialization according to this invention.

FIG. 7 shows a flow chart to describe an example of addition and initialization.

More particularly, the data Di'on each frame is obtained by the photometric measuring with an image sensor and so on (Step S1); the density D'is added and the number N is added (Step S2); and the above measuring steps are repeated for one roll of the film (Step S3). After such a photometric measurement is conducted for a predetermined number times, it is processed by addition of the average A and the number N stored in a memory (Step S4). If the number N has not reached a predetermined upper limit $N_u$, the average and the number thereof are stored in a memory as they are (Steps S5 and S8), and if it has reached the upper limit $N_u$, the number is returned and stored as the bottom limit $N_L$ (Steps S6 and S8). Above steps are repeated until the suspension of the measurement (Step S7). The data stored in the memory should be erased when the developing agent is replaced, the type of film is switched to another type, or the photographic system or the printer fails. it is desirable to include a means which can erase the stored data or return the data to an initial value with an external input.

Figure 8A:
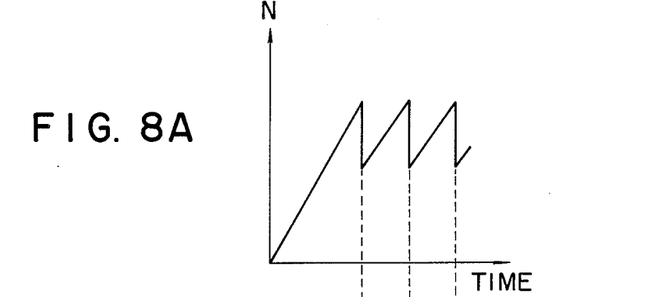
FIGS. 8A and 8B are explanatory graphs of application of this invention method to the determination of photographic printing conditions.
Figure 8B:
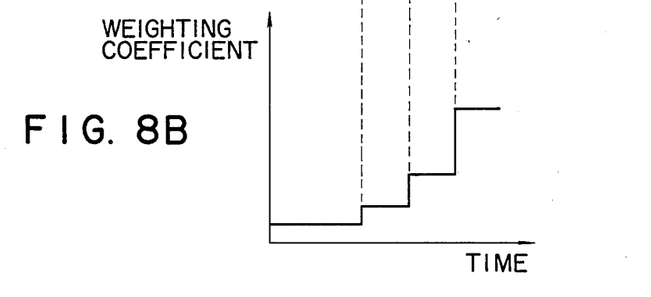

This invention method may be applied in various manners other than above in the photographic printing condition determination; for instance, it can be utilized in determination of a coordinate point, a coordinate region or correction amount on a color coordinate system of a film which has been exposed with tungsten light. It is also applicable to the determination of the tendency of density correction or color correction to obtain the most suitable conditions. It may be aplied to the detection and correction of the chronological deterioration or the various changes in measurement device of the image, display unit or output device. FIG. 8A shows the clipping of data in relation to time while FIG. 8B exemplifies the weighting coefficients of the past data.

Although the photographic characteristics are variables of time, since they are weighted with the data up until the current time point by estimating the current conditions in this invention method, suitable and precise control and administration thus becomes possible.

Figure 9:
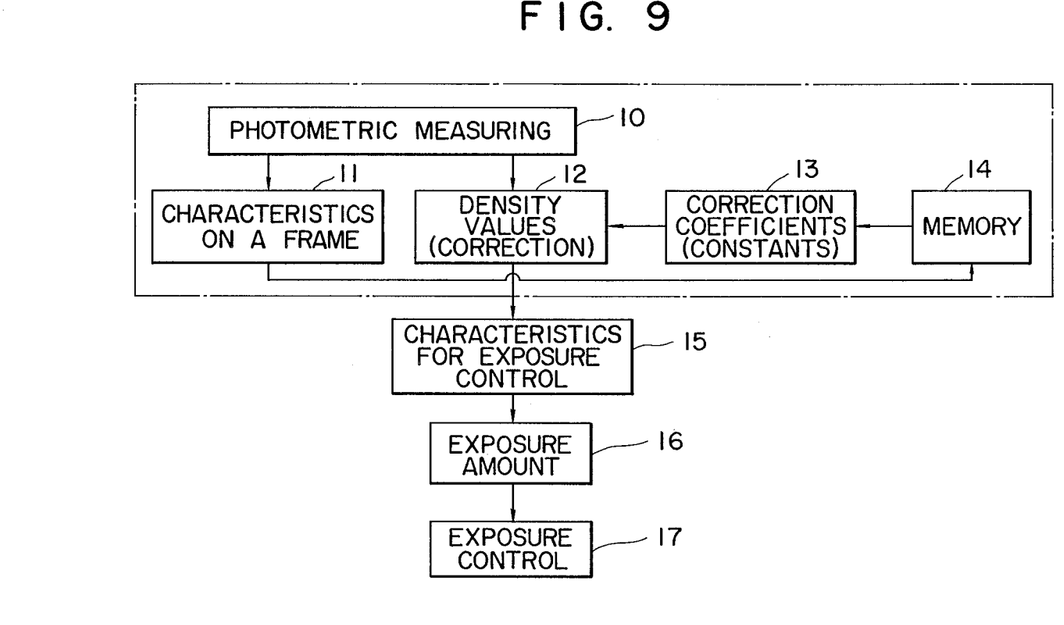
FIG. 9 is a block diagram which shows one example of a device to realize this invention normalization method.

FIG. 9 is a block diagram of the system which realizes this invention normalization method wherein a color negative film as an original film is photometrically measured (10) in the three primary colors of RGB with photodiodes or an image sensor, the characteristics 15 (e.g. average density, the maximum density, the minimum density) for exposure control are obtained from the density values due to the data obtained in the measurement, the exposure amunt is calculated (16) with the characteristics 15 in accordance with a predetermined formula, and a photographic printer is controlled (17) in exposure with the obtained exposure amount. Simultaneously, the characteristics 11 (such as average density on the whole or portions of a frame, the maximum or the minimum density, density histogram or hues, etc.) on a frame are obtained, and the characteristics 11 are stored in a memory 14. From the data stored in the memory 14, the correction coefficients (or constants) 13 are obtained to correct (12) the density values obtained from the measurement 10 and the characteristics 15 for the exposure control are calculated based upon the result of the above correction.

The characteristics 11 obtained from the photometric measuring 10 are compared with predetermined density divisional values, the average of frames having the characteristics larger than the division are expressed as $A_j$ while the average data of frames having the characteristics smaller than it are expressed as $B_j$. As j=1, 2, 3 or R, G, B, the correction coefficient 13 to normalize the measured data is obtained by $A_j$ and $B_j$ or combination thereof. For instance, if it is assumed that the measured data is Dij and the correction value is $D'_{ij}$, the correction coefficients for gradation and the correciton coefficients for density balance may be respectively obtained by a combination of $A_j$ and $B_j$. When normalization is conducted based on the data G out of the measured data on the three primary colors, it may be obtained by the following calculation.

$$\begin{aligned} D'_{i1} &= (D_{i1} - B_1) \cdot \{(A_2 - B_2)/(A_1 - B_1)\} + K \\ D'_{i2} &= (D_{i2} - B_2) + K \\ D'_{i3} &= (D_{i3} - B_3) \cdot \{(A_2 - B_2)/(A_3 - B_3)\} + K \end{aligned} \quad (1)$$

when the measured data on RGB should be normalized based upon a predetermined film characteristic curve, it may be calculated according to the following equation (2).

$$\begin{aligned} D'_{i1} &= \{D_{i1} - (B_1 - S_1)\} \cdot G_1/(A_1 - B_1) \\ D'_{i2} &= \{D_{i2} - (B_2 - S_2)\} \cdot G_2/(A_2 - B_2) \\ D'_{i3} &= \{D_{i3} - (B_3 - S_3)\} \cdot G_3/(A_3 - B_3) \end{aligned} \quad (2)$$

K in the former equation (1) may be $B_2$ or it may be calculated based on $B_1$ or $A_1$. $S_j$ and $G_j$ in the above equation (2) are reference values. Correction with $B_1$, $B_2$ and $B_3$ may be conducted after the gradient on $D_{ij}$ is normalized in the above equations (1) and (2). In place of $D_{i1}$, $D_{i2}$ and $D_{i3}$, a color difference value comprising a combination of two or three colors thereof may be obtained. The normalization method of this invention is by no means limited to the above equations (1) and (2). For instance, a predetermined and present value may be used to replace the gradation correction value in the equation (1).

Figure 10A:
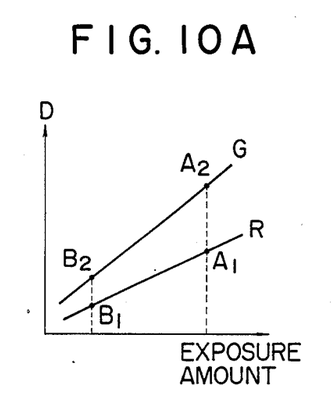
FIGS. 10A through 10C are graphs to describe normalization according to this invention.
Figure 10B:
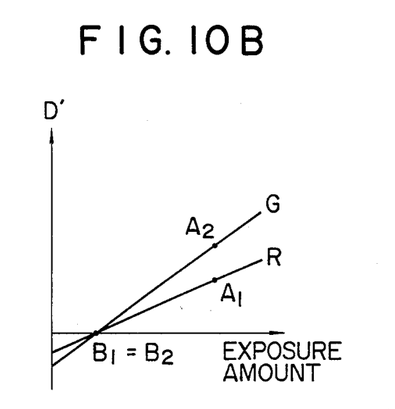
Figure 10C:
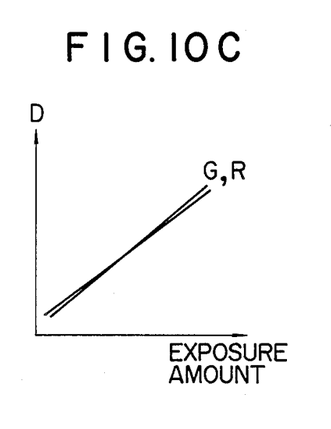

FIGS. 10A through 10C show the states of RGB-normalization of the meaured data for G and R based on G according to the equation (1). FIG.10A illustrates actual data obtained from the photometric mesurement. Gains are corrected in order to make $B_1=B_2$ by means of the equations $R'=R-B_1$ and $G'=G-B_2$ (FIG.10B). The data are further normalized by γ-correction to achieve the relation $R'=(R-B_1)\cdot\{(A_2B_2)/(A_1-B_1)\}+B_2$ and $G''=G$. The state illustrated in FIG. 10C is thus obtained. The same object can be reproduced at the same density and in the same color by transforming the density values at the normalization conditions obtained respectively for each type of the film. This enables the exposure amount to be calculated at the same and constant conditions irrespective of variation of the film types or the processing changes. Only one kind software will suffice for the arithmetic operation on the exposure control.

The characteristics 15 for the exposure control may be obtained by correcting the density values 12 obtained from the measured data with the correction coefficients 13. A frame average density is used as the frame characteristics or $DL_j$ which will be calculated in accordance with the following equation (3).

$$\begin{aligned} DL'_1 &= (DL_1 - B_1) \cdot \{(A_2 - B_2)/(A_1 - B_1)\} + K \\ DL'_2 &= (DL_2 - B_2) + K \\ DL'_3 &= (DL_3 - B_3) \cdot \{(A_2 - B_2)/(A_3 - B_3)\} + K \end{aligned} \quad (3)$$

In determining the printing conditions, if a section for setting the film characteristics is separated from a prior art system, the exposure may be controlled with the density value normalized by this invention method to automatically determine and administer the printing conditions.

Figure 11:
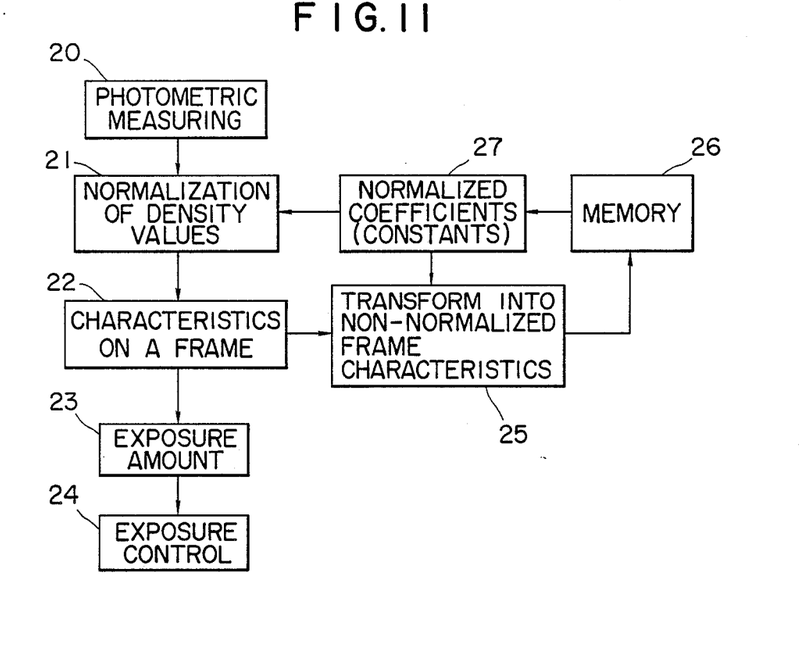
FIG. 11 is a block diagram of another embodiment of this invention.

FIG. 11 shows another embodiment of the normalization method according to this invention wherein the density values obtained from the photometric measurement 20 is normalized (21) thereby to obtain the characteristic 22 on a frame. The exposure amount 23 is calculated in correspondence to the characteristics 22 for the exposure control 24. The normalization steps comprise transforming the characteristic 22 into a nonnormalized frame characteristics 25, storing the transformed data in a memory 26 to obtain the normalized coefficients (or constants) 27, normalizing the density data obtained by the photometric measuring 20 in accordance with the above values and correcting the transformed data 25. The steps of coverting the measured data into the density data by logarithmic transformation and of normalizing the density data can be conducted simultaneously.

Figure 12:
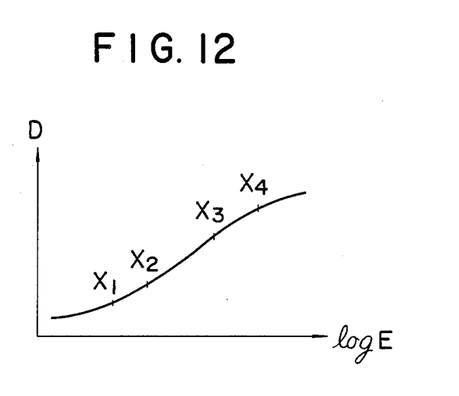
FIG. 12 is an explanatory graph to show how to determine density divisions.

The number of the density divisions mentioned above may be more than two. If it is two, the averages of the characteristics can be obtained in the number of three to form two pairs of the correction coefficients each for the low density zone and the high density zone. Moreover, the divisions may be set at $X_1$ through $X_4$ as shown in FIG. 12 to make the density regions overlap continuously to be divided into the regions less than $X_2$, from $X_1$ to $X_4$, and more than $X_3$. By setting a large number of density divisions, it becomes possible to estimate the shapes of the film characteristic curve, from which overexposed portion or underexposed portion can be controlled suitably. A density division may be a predetermined constant or an average of the characteristics obtained from the measured data, and preferably set at a value to make the nhumber of data above and below the division substantially equal in number. It is desirable to be able to select or correct the data by eliminating abnormal values (such as low density, high density or data extremely out of the color balance) or setting a limit to obviate them so as to enable convergence of a small number of data into an average. An upper and a lower limits may be provided for stored data numbers (frame numbers (so that when it reaches the upper limit, average processing of the data should be started again from the beginning, and until it reaches the lower limit, the initially set value may be used rather than corrected value or the average of all the negative films including all types of the film may be used as a correction value. The correction value may be obtained for each type of the photographic materials (or onr as chosen to cover several types), averaging of data may be stored so that averaging process may be conducted once an order or once a day. Alternatively, the sum of characteristics may be stored in place of averages. The averaging process may be taken in this case at the time of switching printer channels at the beginning of an order.

Figure 13:
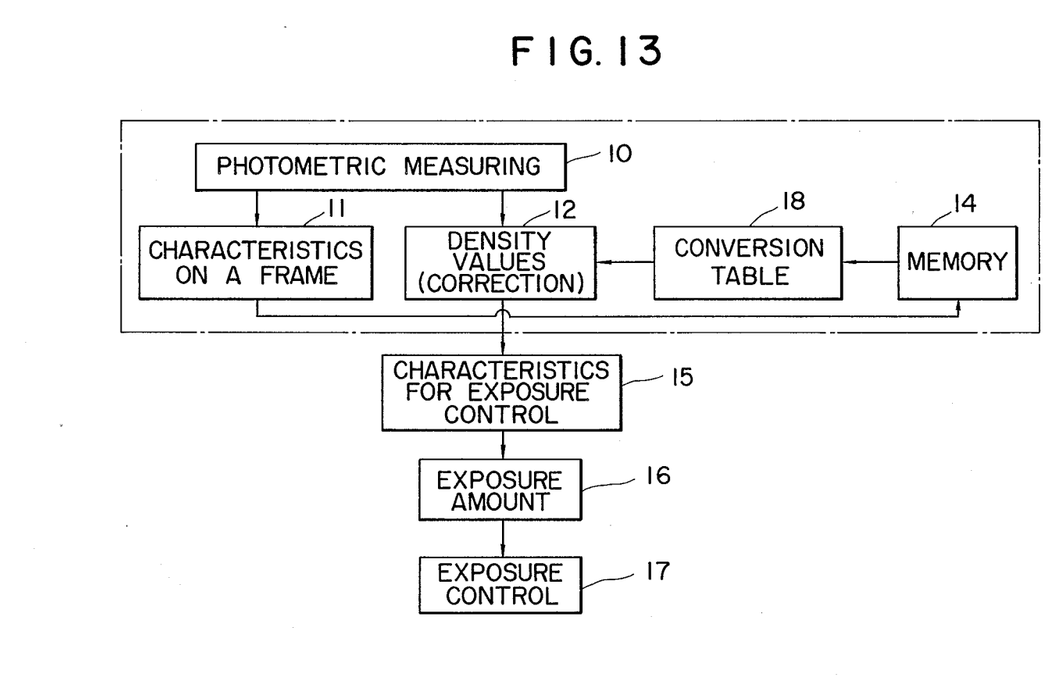
FIG. 13 is a block diagram which shows a device to realize still another embodiment of the normalization method according to this invention.

FIG. 13 is a block diagram to show still another embodiment of the device to realize this invention normalization method in correspondence with the block diagram shown in FIG. 9. A conversion talbe 18 is prepared for normalization by using the data stored in the memory 14, the data in density obtained from the photometric measuring 10 are corrected (12), and the characteristics 15 for the exposure control are obtained based upon the correction. The photometric measuring 10 may be conducted twice; one each for calculation of the characteristics 11 on a frame and for correction (12) of the density values. Or the density values may be stored in a memory and corrected the stored data in the memory.

The effect of storage of frame characteristics at the memory 14 will now be described. As is widely known, almost all the frames of film are gray with slightly yellow greenish tint. It is possible to precisely produce the color by obtaining an average in LATD of a large number of film rolls. The result of experiments revealed, however, the values not necessarily in LATD but of other frame characteristics. Moreover, it was revealed that even if the area is divided into two; i.e. the densities more than the average and the densities less than the average, and the average is obtained once each for two frame characteristics, they show the same color. From such a finding, it was deducted that the film density may be normalized with the average of the frame characteristics of the two density areas. Frame characteristics are added (accumulated) at the data of the memory 14 and an average is obtained at the time of preparing the conversion table 18.

The conversion table 18 may be prepared as follows. The characteristics 11 obtained from the photometric measuring 10 are compared with the density division value which is preset, the accumulated data on a large number of frames having the characteristics larger than the value are designated as $A_j$ while those having the characteristics smaller than it are designated as $B_j$. Using the relationship that j=1, 2, 3 or R, G, B, $A_j$, $B_j$ or a combination thereof, the conversion table 18 may be prepared for data normalization. For example, if the measured data is $D_{ij}$ (i =number of measuring spots) and the corrected value as $D'_{ij}$, a value for the optimum density balance and the gradation correction will be obtained by combining $A_j$ and $B_j$. When the conversion table 18 is prepared for the normalization based on G out of the measured data on three primary colors, the values of $D'_{i1}$ and $D'_{i3}$ obtained by calculating $D_{i1}$ and $D_{i3}$ for "0" through "255" by the above formula (1) should be stored in the conversion table 18. When the conversion table 18 is prepared for normalizing the data on RGB based on a predetermined characteristic curve of the film, the above formula (2) should be relied.

Figure 14:
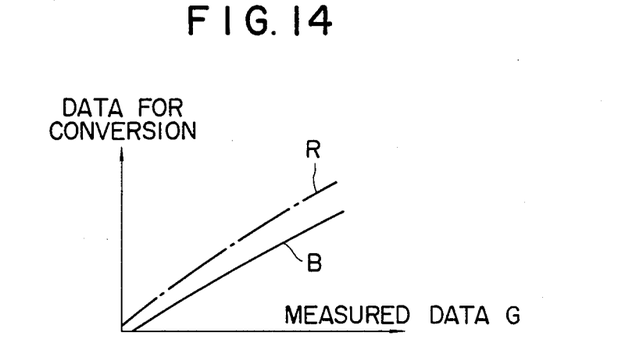
FIGS. 14 and 15 are graphs which explain the normalization.

As FIG. 14 shows, a curve is plotted for the average obtained from the stored data of R and B by referring to the reference or the average obtained from the stored data of G, from which is prepared a conversion table to transform the measured data on R and B into the measured data on G for normalization. The measured data on G do not have to be transformed by the conversion table, but are used as they are. By these normalization processing, the same object can be imaged on a negative film irrespective of the types of the photographic materials or developing processes.

Figure 15:
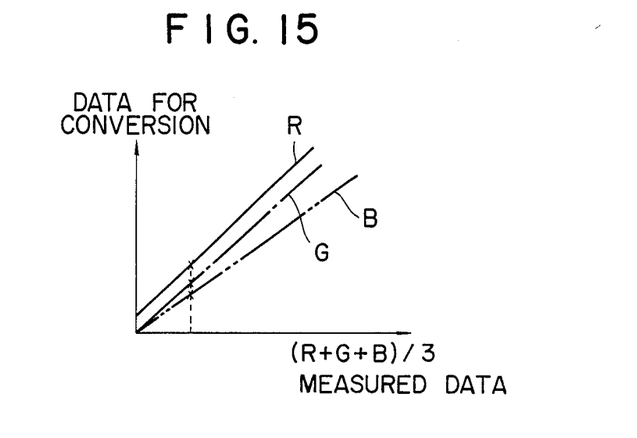

The reference may be the measured data of (R+G+B)/3 as shown in FIG. 15. It may also be the data of (0.3X R+0.6X G+0.1X B )/10. Two or more of the RGB measured data may be combined suitably to be used as the reference. The cross marks in FIGS. 14 and 15 represent respective averages which are obtained by shifting R and B or R, G and B by a predetermined amount for the relationship between the color of the average and neutral color in the frame characteristics. The relation between the above two is not limited to the above, but may be otherwise included in calculation.

The conversion table 18 may be prepared in advance in the form of a table by calculating reference values for "0" through "255". In case the density division value is set at one point, the stored data larger or smaller than the point are obtained. This is a linear transformation. For instance, when a large number of measured data should be transformed, it may take lots of time if one of the equations of linear transformation (1) and (2) is to be applied to each of the measured data for two or three colors. Time can be shortened remarkably by using a conversion table. When the density division value is two or more in number, the transformation is nonlinear, and the conversion table may be prepared by linear interpolation or polyominal interpolation between the stored data. It is advantageous to use the conversion table rather than using a transformation formula in the speed of operation or degree of freedom allowable to non-linearity type.

Such a conversion table may be prepared at the time when a type of film is switched to another (channel switching), for one film roll, or for a predetermined amount of the stored data. It may also be prepared at the start of a work day for the channels to be used for the data based on the data accumulated by the preceding day. A magnification n (n= product by multiplication with 0.5–2.0) for each type of the film may be used as the reference value. The value of n is determined in advance. For example, n is set at 1.0 for the film of ASA 100 made by a manufacturer A while it is set at 1.12 for the film of ASA 100 by the manufacturer B. This enables elimination of the influence by the gradation of the film (γ-value). Further, a conversion table may be prepared by plotting "the data before conversion" −"reference value" at the vertical axis.

The density values 12 obtained from the measured data are corrected by referring to thus mae convesion table 18 to obtain the characteristics 15 for the exposure control. For obtaining the average density, a frame is divided into 12 cells each of which comprises the measurement points of 6×6=36. The average of a cell may be used as an average density data for storage. When the amount of data is small, this method is preferable as it achieves a higher precision over a wider density area than the case where a whole frame is processed as a single data. If the whole frame is treated as one data, it can not have a high density as it has been averaged and the number of densities is small. Each of the measured point may be stored in a memory, but this is not very effective as the averages do not become uniform even for a large number of data.

Figure 16:
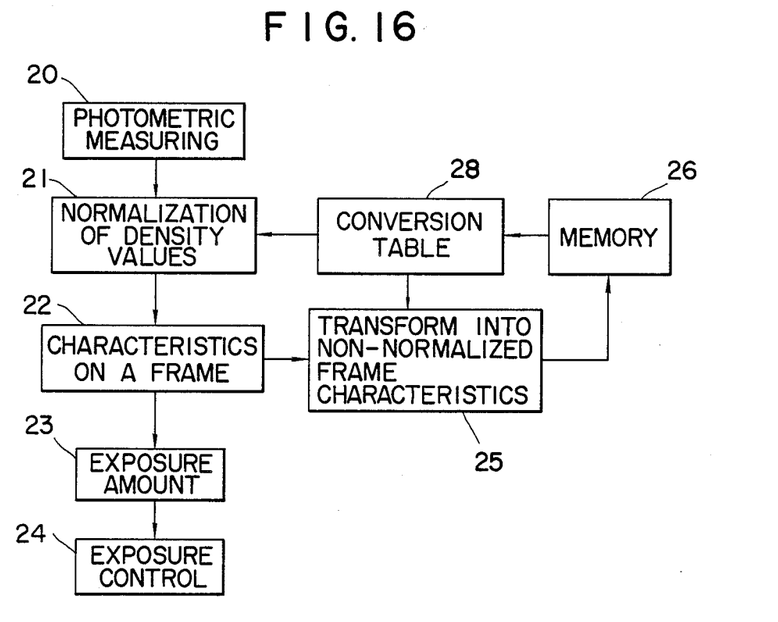
FIG. 16 is a block diagram to show still another embodiment of the normalization according to this invention.

FIG. 16 shows another embodiment of this invention in correspondence with the one shown in FIG. 11. A conversion table 28 is prepared for normalization by storing in a memory 26 the data for transformation into frame characteristics before normalization. Density values of the photometric measuring 20 are normalized (21) in a manner mentioned above in accordance with the conversion table 28 and the converted data 25 are corrected at the same time.

The above statement was given in relation to the normalization process for the measured data or density data, but the process may naturally be applied for the frame characteristics or the exposure conrol characteristics. This invention method is remarkable in processing speed as respective meaured points do not need to be transformed.

The frame characteristics to be used for averaging may be the average density(s) of a whole frame or portions of a frame, weighted average, average density at selected point(s), the mean value between the maximum and the minimum densities, the average density of a main object or of background or a combination thereof. The abnormality or deviation detected at the development processing or the photometric meaurement device from the changes in averages or normalization coefficients may be displayed or outputted as an alarm to automatically correct or replace the developing agents and/or modify the printing conditions. Moreover, the difference in averages between photographic materials is used to detect the difference in the printing conditions between the photo-sensitive materials to automatically correct and control the exposure amount. Although description is given to the case of a negative film in the above statement, other types of film such as the reversal film or printed photographic paper may be used in this invention. This invention method is applicable to other types of copying materials (thermal, magnetic, or other types) or to an image display device.

This invention normalization method enables automatic normalization at a high speed for various types of film to be printed withput need for any reference film. This invention method can be applied to non-linear type of normalization to precisely conduct normalization for low density portions. This invention method further makes correct judgement of colors in objects imaged with an artificial light which often causes the underexposed images to thereby enable highly precise control over the exposure. This invention method is further applicable to automatic control of variation in the developing process conditions, the emulsion numbers, the seasons or the devices.

It should be understood that may modifications and adaptations of the invention will become apparent to those skilled in the art and it is intended to encompass such obvious modifications and changes in the scope of the claims appended hereto.

What is claimed is:

1. A normalization method for photometric measured data in a photographic printing system of the type where frames of original films to be printed are photometric measured in three primary colors as a large number of points thereon, a printing exposure amount is determined based on a large number of photographic measured data obtained from the photometric measurement of said original films, and said original films are printed with said printing exposure amount, said method comprising the steps of:

preparing reference data by using either one of the photometric measured data of the three primary colors or average values of at least two photometric measured data of the three primary colors;

classifying said reference data on said original films into plural classes in order of value;

obtaining first average values of a large number of reference data belonging to respective said classes;

obtaining second average values of said photometric measured data for respective said colors by classifying said photometric measured data for respective reference data in accordance with said classes;

obtaining a conversion table of said second average values for said first average values; and converting said photometric measured data into said reference data by using said conversion table;

whereby photometric measured data of gray images of said original films become a constant color balance.

2. A normalization method as claimed in claim 1, wherein said first and second average values are average data of photometric measured data of a large number of original films.

3. A normalization method as claimed in claim 1, wherein said three primary colors are red, green and blue, and said conversion table is prepared for the red, the green and the blue so as to normalize the three photometric measured data of said original films.

4. A normalization method as claimed in claim 1, wherein one of the photometric measured data is green.

5. A normalization method as claimed in claim 4, wherein conversion tables for the red and the blue are prepared so as to normalize the photometric measured data of the red and the blue of said original films.

6. A normalization method as claimed in claim 1, wherein data in said conversion table are discontinuous digital data and intermediate data between said discontinuous digital data are respectively interpolated by average data of at least two data of both sides of said discontinuous digital data.

7. A normalization method as claimed in claim 1, wherein said first average values are weighted moving average values obtained by multiplying weight coefficients depending on time from the photometric measuring to current.

8. A normalization method as claimed in claim 1, wherein said first average values are weighted moving average values obtained by multiplying weight coefficients depending on data numbers from the photometric measuring to current.

* * * * *